(12) United States Patent
Twarog et al.

(10) Patent No.: US 8,949,009 B2
(45) Date of Patent: Feb. 3, 2015

(54) DRIVER DISPLAY OF ENERGY CONSUMPTION AS A MONETARY RATE

(71) Applicant: GM Global Technology Operations LLC, Detroit, MI (US)

(72) Inventors: Christopher J. Twarog, Franklin, MI (US); Goro Tamai, West Bloomfield, MI (US); Anthony J. Corsetti, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/736,350

(22) Filed: Jan. 8, 2013

(65) Prior Publication Data

US 2014/0195140 A1 Jul. 10, 2014

(51) Int. Cl.
*G06F 17/00* (2006.01)
(52) U.S. Cl.
CPC ................... *G06F 17/00* (2013.01)
USPC .......................... 701/123; 705/34

(58) Field of Classification Search
CPC ........................................ G06F 17/00
USPC .............................. 701/123; 705/34
See application file for complete search history.

(56) References Cited

U.S. PATENT DOCUMENTS

2010/0332363 A1* 12/2010 Duddle et al. ................. 705/34
2012/0283940 A1* 11/2012 Smith .......................... 701/123

* cited by examiner

*Primary Examiner* — Mary Cheung
*Assistant Examiner* — Yuen Wong
(74) *Attorney, Agent, or Firm* — Cantor Colburn LLP

(57) ABSTRACT

A computer processor is embedded in a vehicle and a display device embedded in the vehicle is communicatively coupled to the computer processor. The computer executes logic to receive a price per unit of energy that is stored in the vehicle, compute an energy consumption rate of the vehicle over a time period, multiply the price per unit by the energy consumption rate to determine a cost of the energy consumption rate over the time period, and display the cost of the energy consumption rate for the time period on the display device in the vehicle.

17 Claims, 3 Drawing Sheets

DRIVER DISPLAY OF ENERGY CONSUMPTION AS A MONETARY RATE

FIELD OF THE INVENTION

The subject invention relates to vehicle-based driver information and, more particularly, to providing vehicle-based energy consumption information as a monetary rate.

BACKGROUND

The drive to conserve fuel by consumers has resulted in the proliferation of various types of energy-saving vehicles. For example, many environmentally conscious drivers are seeking more compact gasoline-powered cars that offer higher fuel economy, while others are turning to vehicles powered by electric power (EV) or hybrid-electric power (HEV).

While these types of vehicles offer clear savings in terms of energy usage, there are also other factors, such as the driving habits of a consumer that can affect how much energy is consumed. Accelerating too quickly, frequent braking, excess idling, and high-speed driving are among the behaviors that can negatively impact fuel consumption.

While most consumers conceptually understand that their fuel economy is improved by using such energy-saving vehicles and by adopting more energy efficient driving habits, it would be desirable to provide a way to convey the actual energy consumption for the vehicles as a monetary amount, thereby enabling a clear understanding by consumers as to how their vehicles, as well as their driving habits, affect bottom line costs.

SUMMARY OF THE INVENTION

In one exemplary embodiment of the invention, a driver display system is provided. The driver display system includes a computer processor embedded in a vehicle, a display device embedded in the vehicle and communicatively coupled to the computer processor, and logic executable by the computer processor. The logic is configured to implement a method. The method includes receiving a price per unit of energy that is stored in the vehicle, computing an energy consumption rate of the vehicle over a time period, multiplying the price per unit by the energy consumption rate to determine a cost of the energy consumption rate over the time period, and displaying the cost of the energy consumption rate for the time period on the display device in the vehicle.

In another exemplary embodiment of the invention, a method for implementing a driver display is provided. The method includes receiving, via a computer processor embedded in a vehicle, a price per unit of energy that is stored in the vehicle, computing an energy consumption rate of the vehicle over a time period, multiplying the price per unit by the energy consumption rate to determine a cost of the energy consumption rate over the time period, and displaying the cost of the energy consumption rate for the time period on a display device in the vehicle.

In yet another exemplary embodiment of the invention, a computer program product for implementing a driver display is provided. The computer program product includes a computer-readable storage medium having instructions embodied thereon, which when executed by a computer embedded in a vehicle, causes the computer to implement a method. The method includes receiving a price per unit of energy that is stored in the vehicle, computing an energy consumption rate of the vehicle over a time period, multiplying the price per unit by the energy consumption rate to determine a cost of the energy consumption rate over the time period, and displaying the cost of the energy consumption rate for the time period on a display device in the vehicle.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
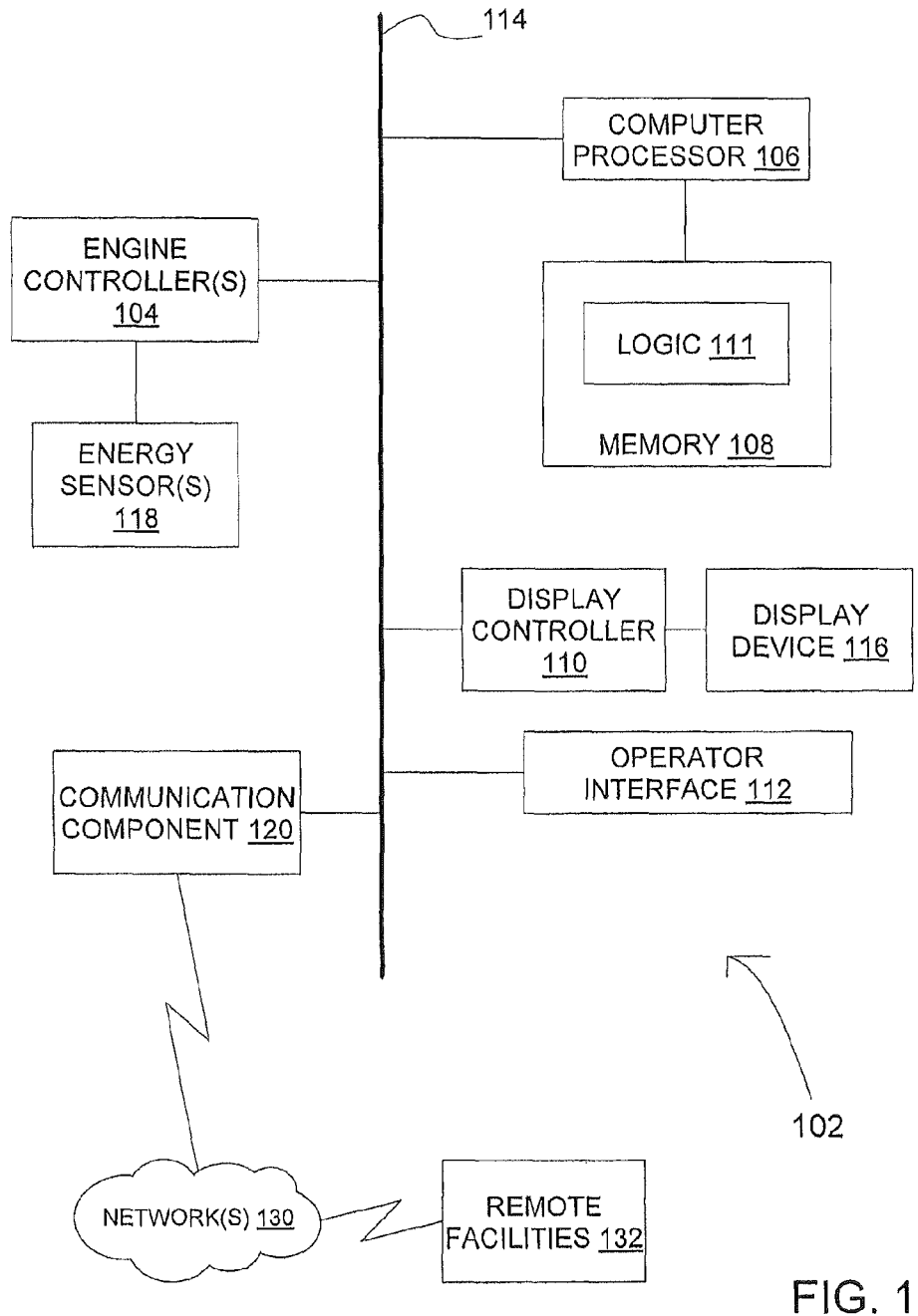
FIG. 1 is a block diagram of a system upon which driver display methods may be implemented according to an embodiment of the invention.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, a driver display system and method is provided. The driver display system and method utilize vehicle information to calculate actual energy consumption for a vehicle as a monetary amount or rate, and presents this information to consumers (e.g., the driver, occupants, or owner) via a display component of the vehicle. This information enables a clear view by the consumers as to how their vehicles, as well as their driving habits, affect bottom line energy costs. The consumption calculation may be adjusted for gasoline-powered vehicles, diesel-powered vehicles, electric-powered vehicles, and hybrid vehicles. These and other features of the driver display system will now be described.

Turning now to FIG. 1, a system 100 upon which driver display methods may be implemented will now be described. The system 100 includes a portion of a vehicle 102 that may be any type of automotive vehicle known in the art. The vehicle 102 may be a gasoline-powered vehicle, a diesel-powered vehicle, an electric only-powered vehicle, a hybrid electric vehicle with no plug-in (HEV), a plug-in hybrid electric vehicle (PHEV), or an extended range hybrid electric vehicle (EREV).

As shown in FIG. 1, the vehicle 102 includes one or more engine controller(s) 104, a computer processor 106, a display controller 110, an operator interface 112, and a communication component 120, each of which is communicatively coupled to a network bus 114 of the vehicle 102. The display controller 110, in turn, is communicatively coupled to a display device 116 in the vehicle 102. In addition, the computer processor 106 is communicatively coupled to a memory device 108, which in turn stores logic 111 that is executable by the computer processor 106 for implementing the exemplary driver display methods described herein.

The controller(s) 104 is communicatively coupled to one or more energy sensor(s) 118, as shown in FIG. 1. Any suitable energy sensor may be employed that is configured to provide an indication of an amount of energy being consumed by the vehicle as a function of time. The controller(s) 104 is configured to process energy information from the vehicle's engine based on the type of energy used by the vehicle 102. For example, if the vehicle 102 is a gasoline- or diesel-powered vehicle, the energy sensor(s) 118 may be implemented as a fuel gauge. If the vehicle 102 is an electric-powered vehicle, the energy sensor(s) 118 may be implemented as an electrical charge measurement device that measures current. If the vehicle 102 is a hybrid vehicle, the energy sensor(s) 118 may include both a fuel gauge and an electrical charge measurement device. Alternatively, energy sensor(s) 118 may include software that utilizes an algorithm to calculate or estimate a value based on a mathematical model.

The engine controller(s) 104, the computer processor 106, and the display controller 110 may be implemented, e.g., as application specific integrated circuits (ASICs), electronic circuits, or processors (shared, dedicated, or group). As indicated above, the computer processor 106 executes the logic 111, which may be one or more software or firmware programs, a combinational logic circuit, and/or other suitable components that provide the described functionality. In an embodiment, the computer processor 106 is part of a vehicle control module. The logic 111 processes data from various sources and provides the results (e.g., the charge-related impact information) to the display controller 110 for display on the display device 116.

The memory device 108 may include any type of memory, such as hard disk memory, virtual memory, random access memory, and cache memory.

The display controller 110 receives inputs from the computer processor 106 over the network bus 114 and presents energy consumption information on the display device 116 for viewing by an owner or operator of the vehicle 102. The display device 116 may be implemented using any suitable display, including those using plasma, light emitting diode, or liquid crystal display technologies. In an embodiment, the display device 116 may be part of a navigation system of the vehicle 102 or may be part of an infotainment system of the vehicle 102. Driver display screens 300, 400, and 500 illustrating sample energy consumption information as a monetary rate that is presented on the display device 116 are shown and described in FIGS. 3-5.

The operator interface 112 is configured to receive inputs from an operator of the vehicle 102. The operator interface 112 may include one or more of an interactive display (e.g., where the display device 116 is a touch screen display), indicator, gauge, switch, knob, touch screen, voice command, button, dial, and the like, or a combination thereof. In an embodiment, the operator interface 112 may be part of another vehicle system, including an onboard navigation system or infotainment system. The operator interface 112 receives the operator input and sends the input to the computer processor 106 over the network bus 114. The operator input is described further herein.

The network bus 114 is integrated with the vehicle 102 and may be part of a physically wired network, a wireless network, or a combination thereof. In one embodiment, the network bus 114 may be a local area network that communicatively couples electronic components of the vehicle with the computer processor 106. If the network bus 114 is part of a wireline network, the network bus 114 may include one or more serial data buses or other data connections.

The communication component 120 may be implemented as a transceiver, an OnStar™ communication system, cell phone, or similar networked device. The communication component 120 is configured to receive instructions via the operator interface 112, as well as from one or more remote facilities 132 (e.g., over one or more networks 130). To communicate with a remote facility 132, the computer processor 106 provides information to the communication component 120, which transmits the information to the remote facility 132 over the network(s) 130. Likewise, the communication component 120 may receive information from the remote facility 132 via the network(s) 130 and forward the information to the computer processor 106 over the network bus 114. The remote facilities 132 may include a telematics service provider, such as OnStar, as well as electric power suppliers, as will be described further herein.

The network(s) 130 may be any type of network known in the art, e.g., satellite, cellular, terrestrial, etc.

As indicated above, the driver display system and method utilize vehicle information to calculate actual energy consumption for a vehicle and provide this information to a vehicle operator as a monetary amount via a display device in the vehicle. By providing this information as a monetary rate, the operator is able to better understand how his/her vehicle, as well as his/her driving habits, affect bottom line energy costs.

The energy consumption calculation may be adjusted for gasoline-powered vehicles, diesel-powered vehicles, electric-powered vehicles, and hybrid vehicles. In addition, the monetary unit displayed for the operator may be modified for different monetary systems (e.g., U.S. dollar, Euro, etc.). Further, the unit of energy may be modified according to the type of energy consumed by the vehicle, as well as the energy metric or measurement unit associated with different countries (e.g., liter or gallon for fossil fuels, or kilowatt hour for electricity). In an embodiment, at least a portion of these modifications may be implemented by the vehicle owner or operator (e.g., at the time of purchase, lease, or rental or thereafter). The modifications may be implemented by the owner or operator through inputs to the operator interface 112.

Figure 2:
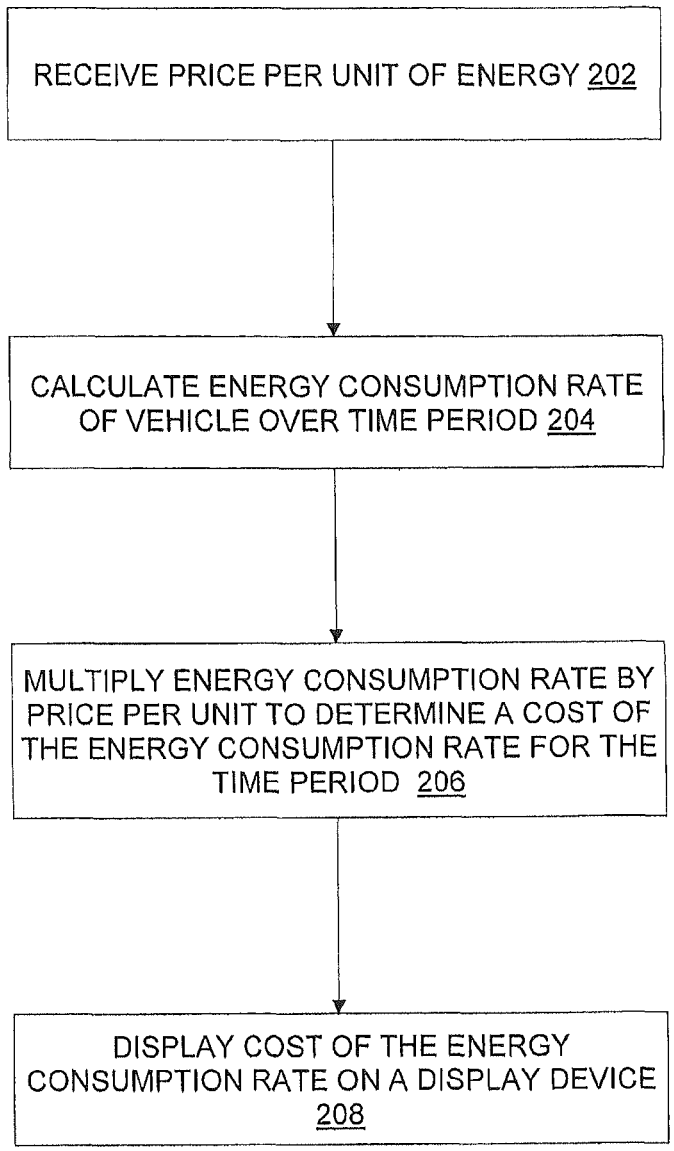
FIG. 2 is a flow diagram describing a process for implementing a driver display system in accordance with an embodiment of the invention.

Turning now to FIG. 2, a process 200 for implementing the driver display system will now be described in an exemplary embodiment.

At step 202, the logic 111 receives a price per unit for energy used by the vehicle 102. As indicated above, the unit may be measured in liters, gallons, kilowatt hours, or other metric based on the type of energy consumed, as well as the type of measurement unit employed in different regions. The price per unit for energy may be provided to the logic 111 from one or more information sources using various techniques. In one embodiment, the price per unit may be input by the vehicle operator via the operator interface 112 which resides in the vehicle 102 (e.g., as part of the driver information center, navigation system, infotainment system, or the like). In this embodiment, the price per unit is transmitted over the bus 114 to the computer processor 106. In another embodiment, e.g., when the vehicle 102 is equipped with telematics (e.g., via the communication component 120), the price per unit may be received from a remote facility 132 (e.g., a telematics service provider) over the network(s) 130. In this embodiment, the telematics service provider identifies the price per unit based on the geographic coordinates of the vehicle 102, which in turn, may identify a service station or charging station. The telematics service provider may then determine the current price per unit for the service station or charging station. For example, if the service station is a gasoline service station, the telematics service provider may presume that the price per unit reflects the price per unit for the octane level recommended for the vehicle 102. The telematics service provider then transmits the price per unit over the network(s) 130 to the communication component 120 in the vehicle 102, which in turn, forwards the price per unit over the bus 114 to the computer processor 106. In a further embodiment, the price per unit may be acquired over a cellular network (e.g., one of the networks 130) via a cellular communication system (e.g., the communication component 120) in the vehicle 102 using geographic coordinates as described above with respect to the telematics system. The logic 111 may be configured to provide an option on the display device 116 to prompt the operator to select the information source (e.g., user input or telematics service provider).

The price per unit received by the logic 111 may be updated based on energy sensor information. For example, if the vehicle is a gasoline-powered vehicle or a diesel-powered vehicle, the energy sensor 118 may be a fuel gauge which is monitored by the engine controller 104 to determine a re-fuel or replenishment event. A re-fuel or replenishment event is determined by the controller 104 when a threshold level increase in the amount of available fuel (e.g., a three- or five-gallon increase) is detected based on the information gathered from the energy sensor 118. If the vehicle 102 is electric powered, the energy sensor 118 may be an electrical charge measurement device, and the replenishment event is determined by the controller 104 when a threshold level increase in the amount of electric charge is detected or when the vehicle is plugged in to a power source (e.g., grid). In an embodiment, the logic 111 may be configured, upon determination of a replenishment event, to automatically trigger a prompt to an information source (e.g., the vehicle operator, the telematics service provider, etc.) to provide a price per unit update.

At step 204, the logic 111 calculates an energy consumption rate of the vehicle 102 for a given time period. In one embodiment, the logic 111 calculates the energy consumption rate for a time period that is defined by one hour to provide a current or instantaneous consumption rate. For example, suppose the unit of measure of the energy is 'gallon,' and the vehicle 102 is a gasoline- or diesel-powered vehicle or a no-plug HEV, the logic 111 determines how many gallons of gasoline or diesel fuel is consumed for the hour. This may be implemented using an equation:

Grams/second*(3600 seconds/hour)/(~2812 grams/gallon);

where 3600 represents the number of seconds in an hour, and 2812 grams represents an approximate weight of a gallon of fuel.

It can be seen from the above equation that the driving habits of the operator are reflected in the calculation, as the grams per second consumed during a drive cycle would correspondingly increase when the operator accelerates, idles, or drives fast, thereby reflecting an instantaneous consumption rate.

Alternatively, suppose the unit of measure of the energy is 'kilowatt,' and the vehicle is electric only, the logic 111 determines how much electricity is consumed by the vehicle 102 in the hour. This equation may be:

High voltage battery pack voltage*high voltage battery pack current/1000.

Alternatively, suppose the unit of measure includes both 'gallon' and 'kilowatt hour,' as in the case of a PHEV or EREV vehicle. The logic 111 determines the energy consumption rate using both of the equations above.

At step 206, the logic 111 multiplies the energy consumption rate produced by any of the three equations above by the price per unit to determine the instantaneous cost or a cost of the energy consumption rate for the time period.

Figure 3:
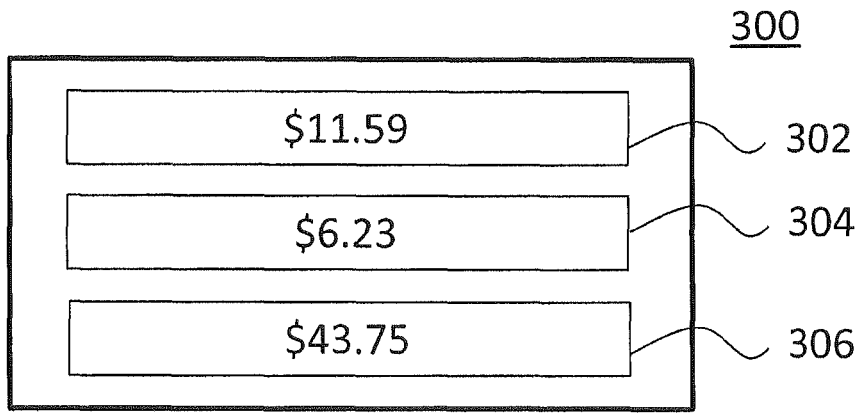
FIG. 3 is a driver display screen depicting energy consumption as a monetary rate for gasoline-powered or diesel-powered vehicles and/or hybrid electric vehicles (without plug-in) in an embodiment of the invention.

At step 208, the logic 111 sends the cost of the energy consumption rate over the bus 114 to the display controller 110, which in turn presents the cost of the energy consumption rate on the display device 116. As shown in FIG. 3, instantaneous energy costs of $11.59 represent a cost per hour and is shown in box 302, instantaneous energy costs of $1.00 represent a cost per hour and is shown in box 402, and instantaneous energy costs of $11.59 (fuel) and $1.00 (electric) are shown in box 502. Screen 300 of FIG. 3 relates to fossil fuel-based vehicles or no plug HEVs, screen 400 of FIG. 4 relates to electric only vehicles, and screen 500 of FIG. 5 relates to PHEV or EREV (with plug) vehicles.

In addition to instantaneous energy costs, the logic 111 may also be configured to calculate an average cost, as well as a trip fuel cost. An average cost refers to the cost of the energy consumption rate averaged over multiple time periods (e.g., 3 hours). For example, if the vehicle 102 consumes $3.00 in a first hour, $5.00 in a second hour, and $4.00 in a third hour, the averaged cost per hour would be $4.00 for a trip defined by the time periods, i.e., ($3.00+$5.00+$4.00)/3.

For a gasoline- or diesel-powered vehicle or a no plug HEV, e.g., the average energy cost may be determined as follows:

($/gal)*gal/hr_avg;

whereby:
Gal_total=Integral (gal/hr)
Hrs_total=Integral (hrs)
Gal/hr_avg=gal_total/hrs_total.

The average energy cost for this type of vehicle 102 is displayed in box 304 of FIG. 3.

Figure 4:
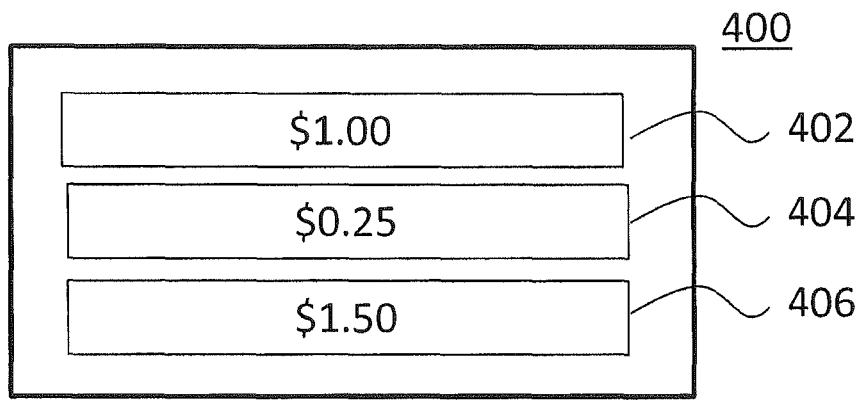
FIG. 4 is a driver display screen depicting energy consumption as a monetary rate for an electric only-powered vehicle in an embodiment of the invention.

For an electric vehicle, the average energy cost may be determined as follows:

($/kWh)*kWh/hr_avg;

whereby:
kWh_total=Integral (kW)
hrs_total=Integral (hrs)
kWh/hr_avg=kWh_total/hrs_total The average energy cost for this type of vehicle 102 is displayed in box 404 of FIG. 4.

Figure 5:
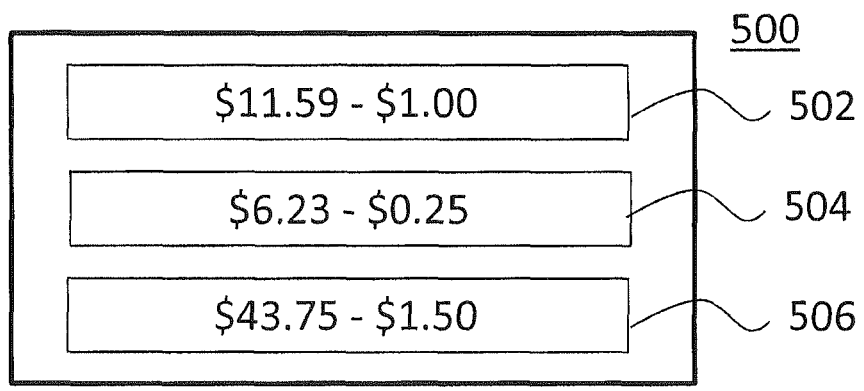
FIG. 5 is a driver display screen depicting energy consumption as a monetary rate for a plug-in hybrid electric vehicle and/or an extended range hybrid electric vehicle in an embodiment of the invention.

For a PHEV or EREV with plug in, the average energy cost may be determined by using the two average energy costs equations above, and the result is displayed in box 504 of FIG. 5.

The trip fuel cost refers to a total cost of the energy consumed over multiple time periods. Using the example above, for a trip in which $3.00 worth of energy was consumed the first hour, $5.00 worth of energy was consumed the second hour, and $4.00 worth of energy was consumed the third hour, the total cost of the trip would be $12.00 ($3.00+$5.00+$4.00). In an example, a total trip fuel cost of $43.75, $1.50, and $43.75-$1.50 is displayed in respective box 306 of FIG. 3, box 406 of FIG. 4 and box 506 of FIG. 5.

While the processing described above in FIG. 2 is primarily performed by the logic 111 of the computer processor 106 of the vehicle 102, the embodiments are not so limited. For example, at least a portion of the processing may be performed by one or more external sources and transmitted to the vehicle 102 via the network(s) 130. For example, the logic 111 may reside on a user device, such as a cell phone and the processing is performed in part on the cell phone, which in turn, transmits results of the processing to the computer processor 106 over the networks(s) 130, which network(s) 130 may include a short range communication network, such as Bluetooth™ or WiFi. In another embodiment, a portion of the processing may be implemented by one of the remote facilities 132 and transmitted to the vehicle 102 over the network(s) 130.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A system, comprising:
 a computer processor embedded in a vehicle;
 a communications component embedded in the vehicle, the communications component communicatively coupled to the computer processor via a vehicle communication bus in the vehicle, the communications component configured to enable communications between the vehicle and information sources, at least one of the information sources is external to the vehicle;
 a display device embedded in the vehicle and communicatively coupled to the computer processor over the communication bus; and
 logic executable by the computer processor, the logic configured to implement:
 determining, via global positioning system coordinates, a location of the vehicle;
 in response to determining, via the global positioning system coordinates, that the vehicle is located at an energy provider:
 prompting a vehicle occupant, via an option on the display device, to select the at least one of the information sources to acquire a price per unit of energy offered by the energy provider; and
 in response to receiving a selection from the vehicle occupant of the at least one of the information sources, accessing the at least one of the information sources via the communications component and acquiring the price per unit of energy offered by the energy provider;
 computing, during a drive cycle and as a function of operator driving behavior, an energy consumption rate of the vehicle over a time period, the computing comprising determining, from an energy gauge in the vehicle, an amount of energy consumed for the time period;
 multiplying the price per unit of energy by the energy consumption rate to determine a cost of the energy consumption rate over the time period; and
 displaying the cost of the energy consumption rate for the time period on the display device in the vehicle.

2. The system of claim 1, wherein the information source is a user interface, the network is the vehicle communication bus, and the price per unit of energy from the information source is received from input by the vehicle occupant through the user interface over the vehicle communication bus.

3. The system of claim 1, wherein the information source is a telematics service provider and the price per unit of energy is transmitted from the energy provider to the telematics server and received by the vehicle over a network.

4. The system of claim 1, further comprising monitoring replenishment of the energy by the energy gauge, wherein the logic is further configured to implement:
 updating the price per unit of energy responsive to the replenishment.

5. The system of claim 1, wherein the unit is at least one of a gallon of fuel, a liter of fuel, and a kilowatt hour, and wherein the time period is one hour.

6. The system of claim 1, wherein the time period is defined by input received from the vehicle occupant.

7. The system of claim 1, wherein the cost is configured in a monetary unit that is received from input by the vehicle occupant.

8. The system of claim 1, wherein the computing the energy consumption rate includes computing the energy consumption rate for a fuel powered vehicle, comprising:
 determining, from the fuel gauge, a number of grams of fuel consumed per second, multiplying a result of the determining by a value representing the time period, and dividing a result of the multiplying by a weight of a measure of the fuel.

9. The system of claim 1 wherein the computing the energy consumption rate includes computing the energy consumption rate for an electric powered vehicle, comprising:
 multiplying a value representing a high voltage battery pack voltage by a value representing a high voltage battery pack current divided by 1000.

10. A method, comprising:
 determining, via global positioning system coordinates, a location of the vehicle;
 in response to determining, via the global positioning system coordinates, that the vehicle is located at an energy provider:
 prompting, with a computer processor, a vehicle occupant, via an option on a display device of the vehicle, to select one of a plurality of information sources to acquire a price per unit of energy offered by the energy provider; and
 in response to receiving a selection from the vehicle occupant of the one of the plurality of information sources, accessing the one of the plurality of information sources via a communications component coupled to the computer processor via a vehicle communication bus in the vehicle, and acquiring the price per unit of energy offered by the energy provider;

computing, with the computer processor, during a drive cycle and as a function of operator driving behavior, an energy consumption rate of the vehicle over a time period, the computing comprising determining, from an energy gauge in the vehicle, an amount of energy consumed for the time period;

multiplying, with the computer processor, the price per unit of energy by the energy consumption rate to determine a cost of the energy consumption rate over the time period; and displaying the cost of the energy consumption rate for the time period on the display device in the vehicle.

11. The method of claim 10, wherein the information source is a user interface, the network is a vehicle communication bus, and the price per unit of energy from the information source is received from input by the vehicle occupant through the user interface over the vehicle communication bus.

12. The method of claim 10, wherein the information source is a telematics service provider and the price per unit of energy is transmitted from the energy provider to the telematics server and received by the vehicle over a network.

13. The method of claim 10, further comprising updating the price per unit of energy responsive to replenishment of the energy as determined by the energy gauge, the energy gauge communicatively coupled to a computer processor of the vehicle.

14. The method of claim 10, wherein the unit is at least one of a gallon of fuel, a liter of fuel, and a kilowatt hour, and wherein the time period is one hour.

15. The method of claim 10, wherein the time period is defined by input received from the vehicle occupant.

16. The method of claim 10, wherein the cost is configured in a monetary unit that is received from input by the vehicle occupant.

17. A computer program product comprising a non-transitory computer-readable storage medium having instructions embodied thereon, which when executed by a computer embedded in a vehicle causes the computer to implement:

determining, via global positioning system coordinates, a location of the vehicle;

in response to determining, via the global positioning system coordinates, that the vehicle is located at an energy provider:

prompting, with a computer processor, a vehicle occupant, via an option on a display device of the vehicle, to select one of a plurality of information sources to acquire a price per unit of energy offered by the energy provider; and in response to receiving a selection of the one of the plurality of information sources, accessing the one of the plurality of information sources via a communications component coupled to the computer processor via a vehicle communication bus in the vehicle, and acquiring the price per unit of energy offered by the energy provider;

computing, with a computer processor, during a drive cycle and as a function of operator driving behavior an energy consumption rate of the vehicle over a time period, the computing comprising determining, from an energy gauge in the vehicle, an amount of energy consumed for the time period;

multiplying, with the computer processor, the price per unit of energy by the energy consumption rate to determine a cost of the energy consumption rate over the time period; and displaying the cost of the energy consumption rate for the time period on the display device in the vehicle.

* * * * *